US008331954B2

(12) United States Patent  
Beck et al.

(10) Patent No.: US 8,331,954 B2  
(45) Date of Patent: *Dec. 11, 2012

(54) SYSTEM AND METHOD FOR DETECTION OF MOBILE OPERATING THROUGH A REPEATER

(75) Inventors: Andrew Beck, Ashburn, VA (US); Tosin Osinusi, Frederick, MD (US); Ariful Hannan, Potomac Falls, VA (US); Tariqul Islam, Germantown, MD (US)

(73) Assignee: Andrew LLC, Hickory, NC (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/841,828

(22) Filed: Jul. 22, 2010

(65) Prior Publication Data

US 2011/0019607 A1 Jan. 27, 2011

Related U.S. Application Data

(63) Continuation-in-part of application No. 10/586,743, filed on Mar. 14, 2008, now Pat. No. 8,045,917.

(60) Provisional application No. 60/570,067, filed on May 12, 2004, provisional application No. 60/570,082, filed on May 12, 2004, provisional application No. 60/570,081, filed on May 12, 2004, provisional application No. 61/293,502, filed on Jan. 8, 2010.

(51) Int. Cl.  
*H04W 24/00* (2009.01)  
*H04W 64/00* (2009.01)

(52) U.S. Cl. ............... 455/456.1; 455/41.2; 455/11.1; 455/434

(58) Field of Classification Search ............ 455/7, 11.1, 455/434, 67.11, 450, 452.1, 452.2, 509, 515, 455/9, 24, 25, 456.1, 456.3, 41.1, 41.2; 370/315  
See application file for complete search history.

(56) References Cited

U.S. PATENT DOCUMENTS

| | | | | |
|---|---|---|---|---|
| 5,541,979 | A | * | 7/1996 | Leslie et al. ............. 455/436 |
| 2001/0031621 | A1 | * | 10/2001 | Schmutz ..................... 455/7 |
| 2002/0072329 | A1 | * | 6/2002 | Bandeira et al. ............ 455/7 |
| 2002/0155839 | A1 | | 10/2002 | Nisbet |
| 2005/0020203 | A1 | * | 1/2005 | Losh et al. ............... 455/11.1 |

\* cited by examiner

*Primary Examiner* — John J Lee  
(74) *Attorney, Agent, or Firm* — Duane Morris LLP

(57) ABSTRACT

A system and method for a network analysis system operating in a wireless communication system with repeaters is disclosed. Embodiments of the system and method enable the network analysis system to determine if signals being received by the network receivers arrive directly from a target mobile appliance or if the signals are passing through a repeater. The repeaters, through an augmentation, measure attributes of a received signal and based on these attributes the system determine whether the signal is served by a repeater or other network device.

17 Claims, 7 Drawing Sheets

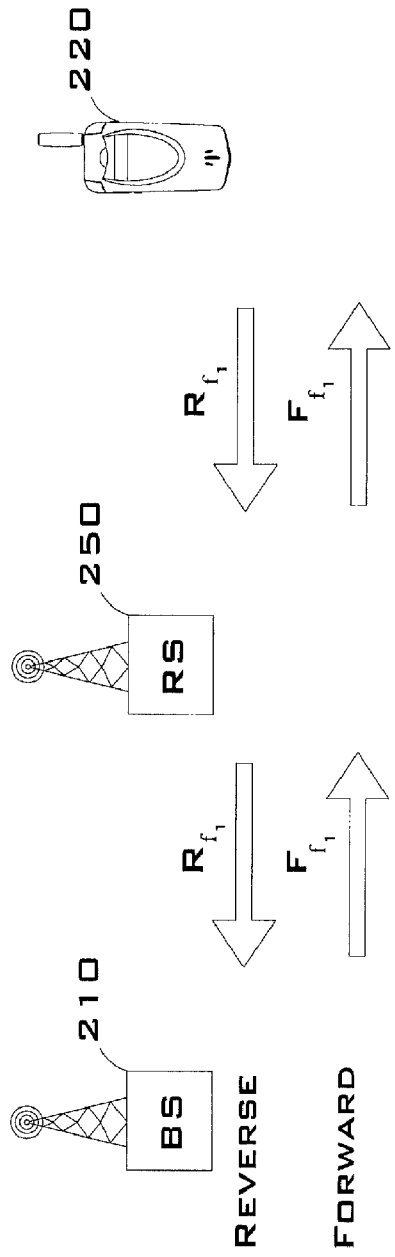
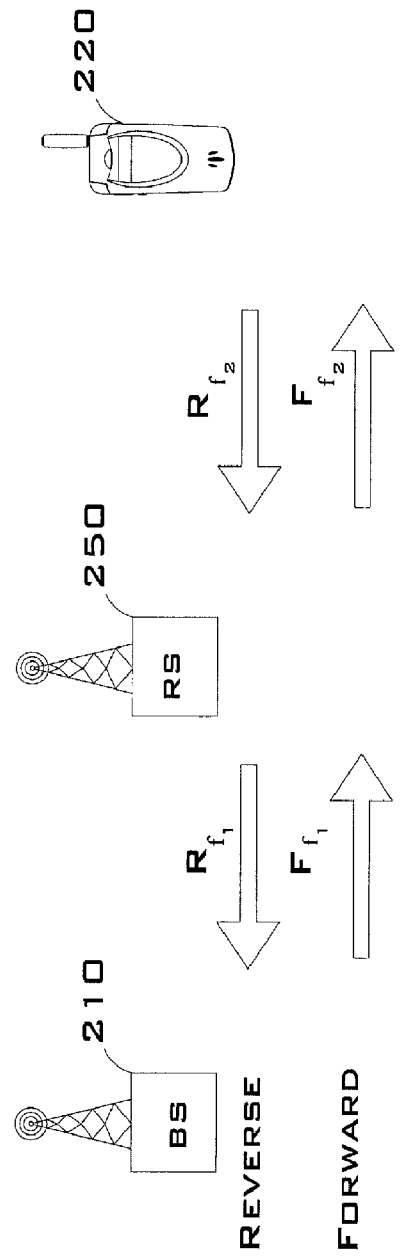

SYSTEM AND METHOD FOR DETECTION OF MOBILE OPERATING THROUGH A REPEATER

CROSS REFERENCES

This non-provisional application is a Continuation in Part and claims priority benefit of co-pending application Ser. No. 10/586,743 filed Jul. 21, 2006, which claims priority benefit of Provisional Patent Application Ser. No. 60/570,067, titled SYSTEM AND METHOD FOR DETECTING A MOBILE STATION OPERATING THROUGH A REPEATER, filed May 12, 2004, provisional application Ser. No. 60/570,082, titled SYSTEM AND METHOD FOR IDENTIFYING THE PATH OR DEVICES ON THE PATH OF A COMMUNICATION SIGNAL, filed May 12, 2004, and provisional application Ser. No. 60/570,081, titled SYSTEM AND METHOD FOR IDENTIFYING THE PATH OR DEVICE ON THE PATH OF A COMMUNICATION SIGNAL USING (1+r(t)) AMPLITUDE MODULATION, filed May 12, 2004, the contents of which are herein incorporated by reference.

This non-provisional application also claims priority benefit of co-pending application Ser. No. 12/246,156 filed Oct. 6, 2008, titled SYSTEM AND METHOD OF UMTS UE LOCATION USING UPLINK DEDICATED PHYSICAL CONTROL CHANNEL AND DOWNLINK SYNCHRONIZATION CHANNEL, the contents of which are herein incorporated by reference. This non-provisional application also claims priority benefit of Provisional Patent Application Ser. No. 61/293,502 filed Jan. 8, 2010, titled MOBILE LOCATION BY PROXIMITY DETECTION, the contents of which are herein incorporated by reference.

BACKGROUND

The subject matter of this disclosure is directed generally towards a wireless communications network for determining whether a signal from a mobile appliance is operated by a repeater or other network device.

The use of wireless communication devices such as telephones, pagers, personal digital assistants, laptop computers, etc., hereinafter referred to collectively as "mobile appliances," have become prevalent in today's society.

FIG. 1 shows a conventional mobile-appliance communication system having base stations 10 *a-c* for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through a wire line connection 41.

To meet the ever growing demand for mobile communication, wireless communication systems deploy repeater stations to expand range and concentration of coverage. In FIG. 1, a repeater 50*a*, associated with base station 10*a*, is located to extend the coverage area to encompass the back side of the mountain 1. The repeater 50*b*, associated with base station 10*c*, is mounted on a building and is used to provide service within the building 2.

Repeaters typically fall into two categories: (1) non-translating, also known as wideband, and (2) translating, also known as narrowband. As shown in FIG. 2*a*, a non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MPC, and the base station controller. As shown in FIG. 2*b*, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

For example, let the set of signals transmitted by N mobiles in the repeaters' input bandwidth be denoted by $$S(t) = \sum_{k=1}^{N} a(k)x(k, t)\sin(wt),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k, t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k, t)\sin(vt)\cos(wt-vt) + G\sum_{k=1}^{N} a(k)x(k, t)\cos(vt)\sin(wt-vt),$$

in which G is the repeater gain. The last equation can be written in a more convenient, mathematical manner by noting that R(t) can be derived from D(t) by writing it as R(t+T) =Re{G exp(j(w−v)tI/(t))}, where G exp(j(w−v)t) is the complex representation of the multiplicative signal introduced by the repeater on the downshifted signal bandwidth and I(t) is the complex representation of D(t).

Essentially, the function of the repeater is to convert the RF signal to an IF signal, delay and amplify that IF signal, up-convert the signal back to RF, and transmit the signal. This is true for both translating and non-translating repeaters.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater or other network device is serving a call. For example, a repeater installed as an in-building distribution system would use indoor antennas to communicate with the indoor handsets and an outdoor antenna to communicate with the host base station.

Repeaters are often not equipped with GPS modules as are location measurement units as such the reference clock of the repeater is subject to drift. This drift is detrimental to detection of the uplink signal.

Repeaters are also generally not aware of the mobiles which they are servicing as described above they repeat any signal received within its domain band.

In order to accomplish location determination in an environment with repeaters, there is a need to overcome the deficiencies in the prior art by employing a novel system and method that is capable of identifying when a mobile's signal is being received via a repeater or other network device by determining its proximity to the repeater. In view of this need, it is an object of the disclosed subject matter to present a method for determining whether a signal is received directly from the mobile or from a repeater in the communication network.

It is also an object of the disclosed subject matter to provide a method by which repeaters may actively assist in determining mobiles in its proximity and thus those mobiles likely served.

The ability to discern the difference between direct signals and repeated signals (i.e., signals that arrive via a repeater) allows for the system to be better managed and is thus advantageous.

These objects and other advantages of the disclosed subject matter will be readily apparent to one skilled in the art to which the disclosure pertains from a perusal of the claims, the appended drawings, and the following detailed description of the preferred embodiments.

BRIEF DESCRIPTION OF THE DRAWINGS

FIG. 2a is an illustration of the operation of a prior art non-translating repeater station.

FIG. 2b is an illustration of the operation of a prior art translating repeater station.

DETAILED DESCRIPTION

Figure 1:
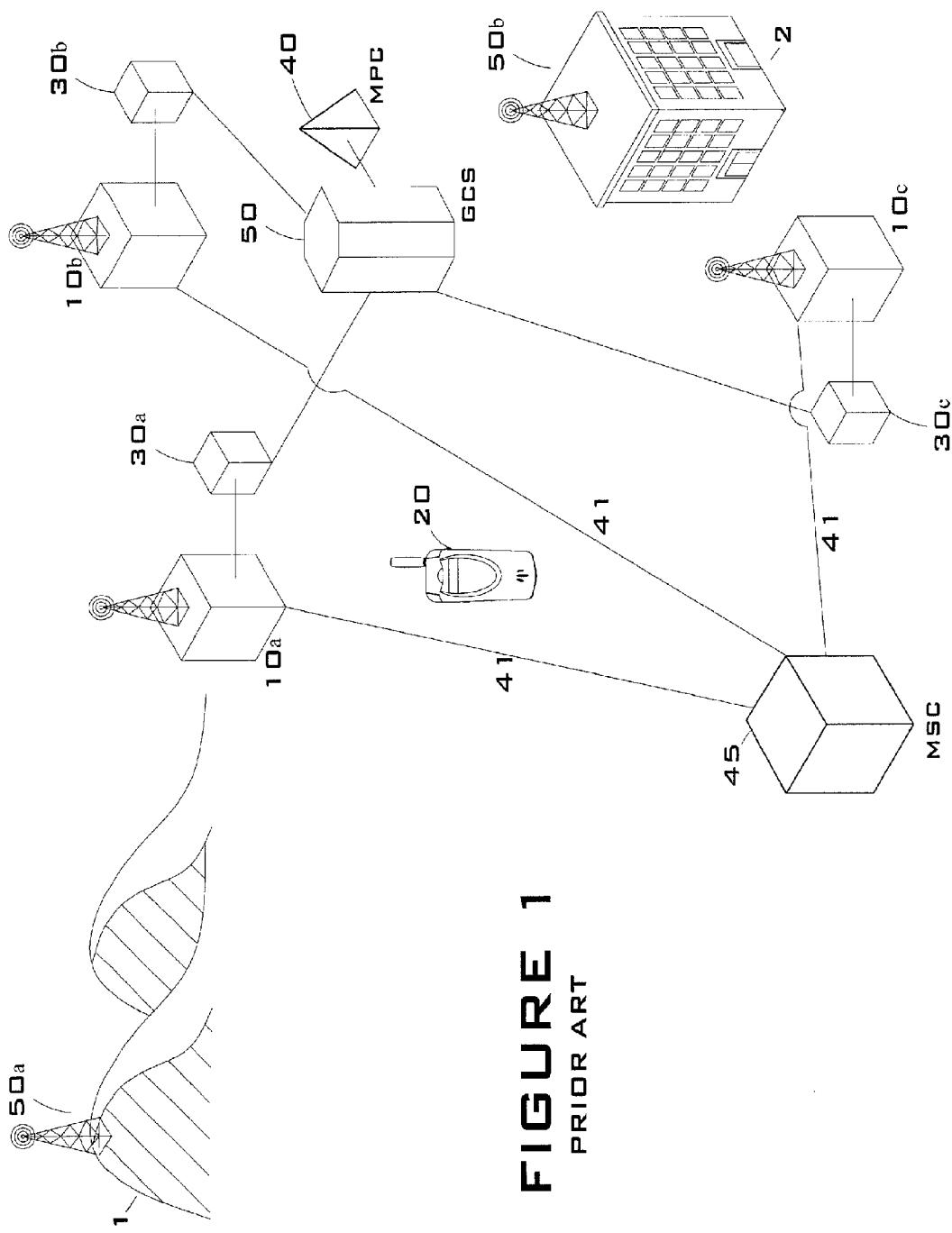
FIG. 1 is a prior art wireless communication system.
Figure 3:
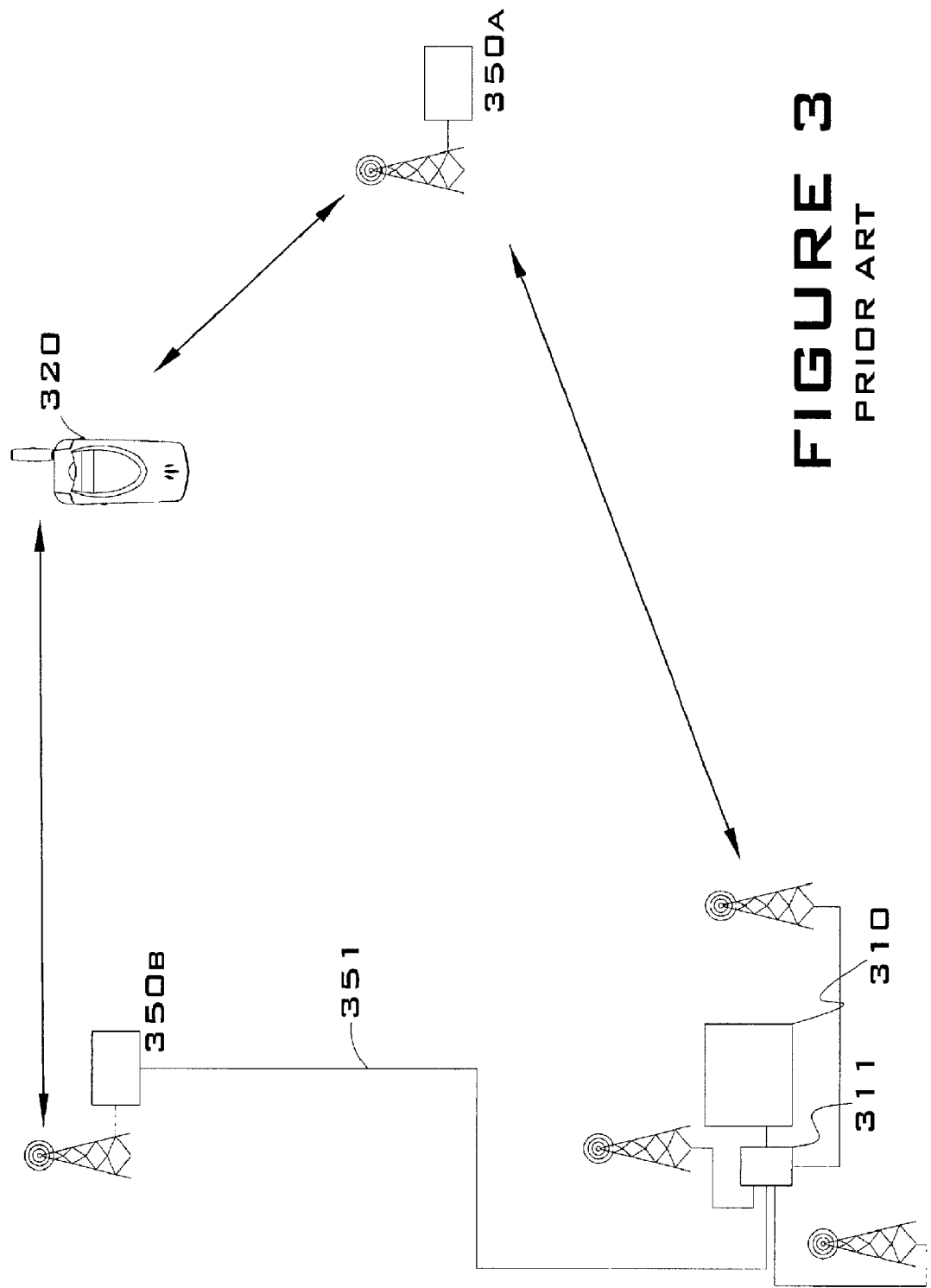
FIG. 3 is an illustration of a prior art wireless communication system with repeater stations connected with an RF link and over a tether.

For the purposes of describing the present subject matter, a communication system is the entirety of an information source (e.g., a mobile transmitter), a transmitted signal conveying that information, a communication path or link/channel, devices along the path through which the signal passes (e.g., a repeater), a host network and an intelligent receiver (e.g., scanning receiver) distinct from the host network. Throughout this disclosure, the terms downlink and uplink will be used interchangeable with forward channel and reverse channel respectfully. No particular distinction is to be applied based on the use of the terms.

The current subject matter relates to a method to determine if a mobile station operating in a wireless network utilizing a repeater is communicating with the base station through the repeater or other network devices or directly with the base station. As previously discussed, repeaters are used to "repeat" the RF signal to enhance range, coverage or service quality; and mobile appliances attached to the wireless network and used as terminal devices for voice or data interfacing.

It may be advantageous for a wireless operator to know how a particular mobile appliance is being served in an area to understand how the wireless network is operating or to size and provision repeaters or other network equipment in an area.

The present subject matter discloses an augmentation to the repeater(s) to assist the network in determining which mobile appliances are operating through the repeater(s) and in another embodiment the augmentation may help the repeater determine which mobile appliances are operational in its proximity.

The augmentation is composed of a scanning receiver and a mechanism for interfacing to a data service used to communicate with the manager. The augmentation may be housed in the repeater and may be connected to the repeater-to-mobile antenna of the repeater. Alternatively, the augmentation may have an antenna and receiver independent of the repeater. Moreover, the augmentation may be physically and operably independent of the repeater altogether. The augmentation scans the reverse link channels where a mobile appliance might transmit and measures energy and/or signal characteristics. These channels can be represented as RF frequencies, time slots, spreading codes or any combination thereof. These measurements may be used to determine if a mobile appliance is operating in the proximity of the repeater antenna. If signal strength and/or quality are high (or within a certain band), then it may be assumed that the mobile is operating through the repeater.

The measurements and/or channel indicators for a mobile appliance determined to be operating through the repeater are transmitted to the manager. The measurements may be analyzed at the augmentation or at the manager to arrive at such a determination. The measurements can be analyzed based on signal strength, particular band of received power, or signal characteristics. The band of received power may be mapped to the power management algorithms that a particular air interface will employ to control the power level of a mobile appliance. Decoding of certain signal characteristics (i.e., presence of sync codes) may indicate sufficient power level to measure signal characteristics, and provide positive indication that the signal energy on that channel is from a device connected to the wireless network of interest.

The measurements or analyses are sent over an interface from the augmentation to the manager over a data service. The data service is most conveniently a data transport mechanism supported by the wireless network of interest. For example, in a Global System for Mobile Communication (GSM) network that supports General Packet Radio Service (GPRS), the measurement data from the augmentation or channel results could be transferred to the manager using this data service. Short Message Service (SMS) services available in TDMA and GSM are also candidates. Wireless connections (e.g., T1, modem, frame relay) are also an option. The manager serves as the control and management device for the augmentation(s), and as an interface point for access to the list of mobile appliances operating through certain repeaters. The manager can have data files indicating where repeaters with augmentations are located in the network, and through connections to other wireless network entities, translate channel information to mobile identity information. In a GSM network, this might consist of translating a traffic channel assignment to a Temporary Mobile Station Identifier (TMSI) or Mobile Station International ISDN Number (MSISDN) through access to network data at the Base Station Controller (BSC) or HLR/VLR.

Implementation of the augmentation and manager in the described fashion is convenient and cost effective. The functions incorporated into the augmentation are formed from common building blocks found in commercial handsets. Thus, the augmentation may be added to a repeater for a fraction of the recurring cost of handset components. The manager may be conceived as a new software component executing on an existing computing device in a wireless network, shared with other functions associated with network entities to which it would be easy to interface.

An important aspect of the presently disclosed subject matter is that the communication network can determine when a received signal from a mobile has passed through a repeater or other network devices. Prior art systems do not have this capability and consequently treat all the received signals as having been directly received from the target mobile. The foregoing embodiments are exemplary only and shall not be used to limit the invention. These examples and others are discussed in more detail below.

Figure 4:
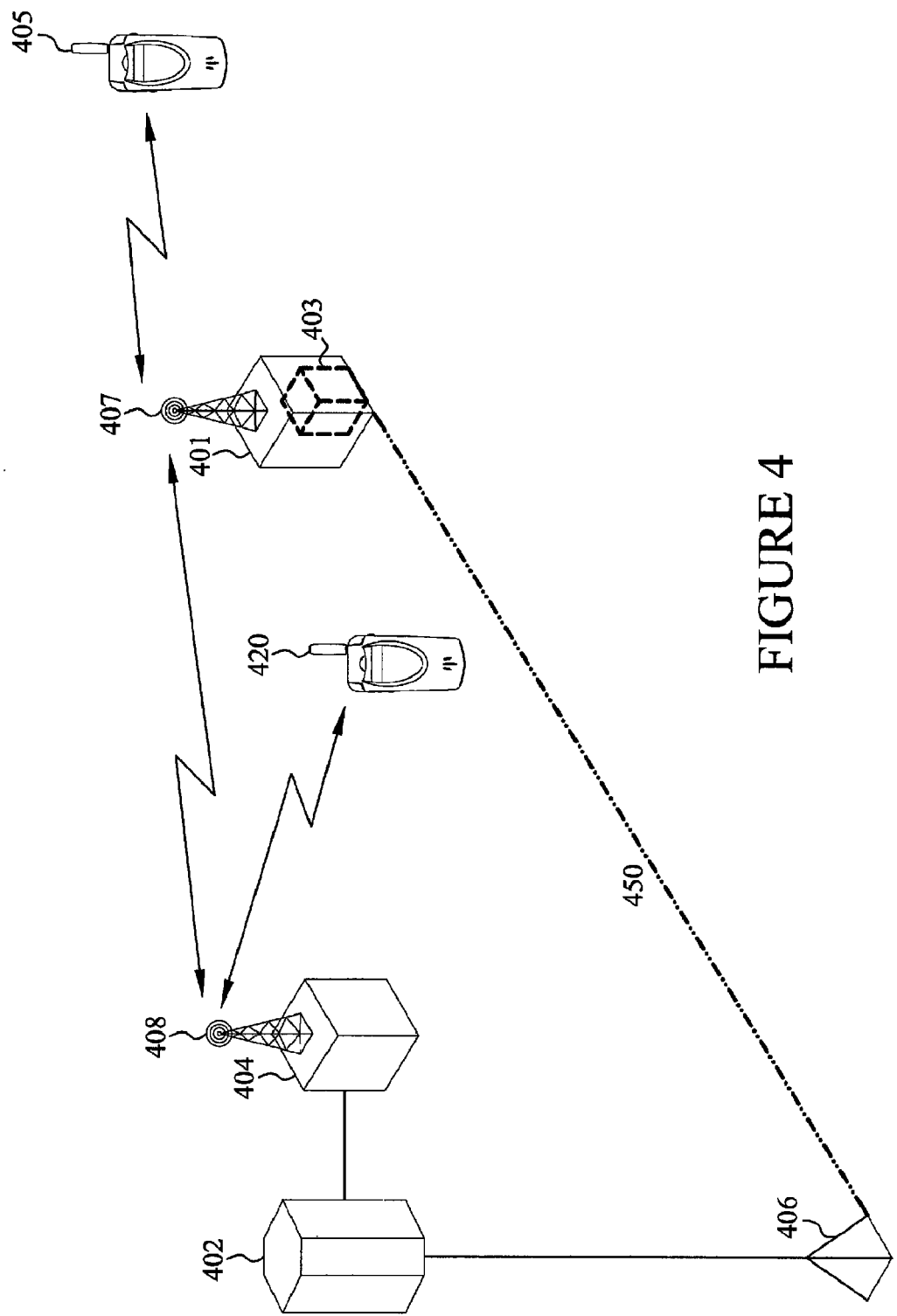
FIG. 4 is a representative flow chart for the operation of a repeater in an embodiment of the present subject matter.

FIG. 4 is a representation of a network analysis system within a communication system according to an embodiment of the present disclosure. The communication system includes a repeater 401, a base station 404, and a base station controller 402, as well as a plurality of mobiles, 420 and 405. As illustrated, the mobile 420 communicates directly with the base station 404, and the mobile 405 communicates with the base station 404 through the repeater 401. Antennas 408 and 407 are associated with the base station 404 and the repeater 401, respectively. The repeater 401 is augmented with a scanning receiver that communicates with a manager over an interface 450. The interface 450 may take the form of a separate channel within the communication system or a dedicated wireless, wireline or other communication link.

Figure 5:
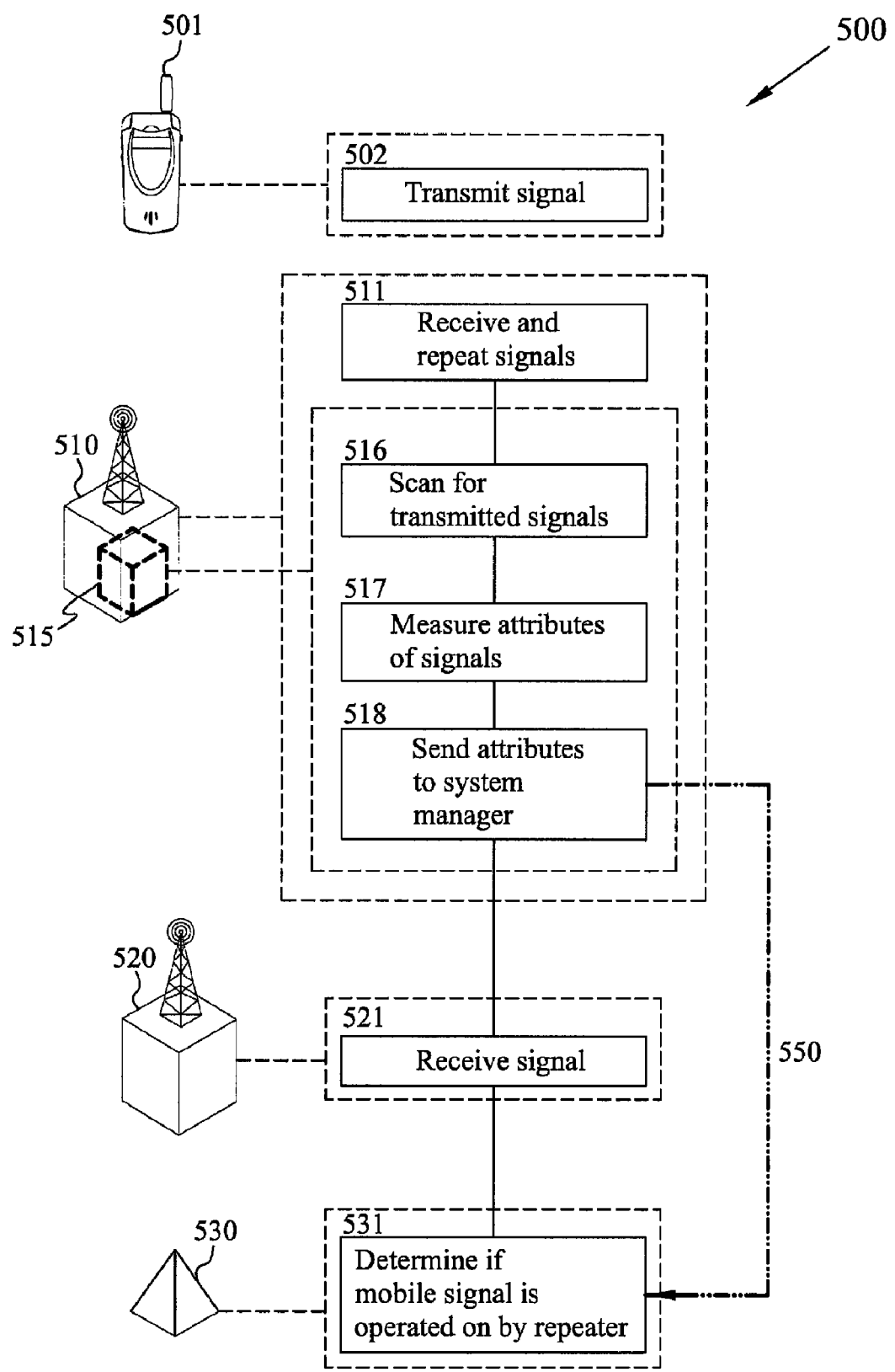
FIG. 5 is a representative flow chart for the operation of a network analysis system according to an embodiment of the present subject matter.

FIG. 5 is a representational flow chart of a method for detecting a mobile operating through a repeater according to an embodiment of the present subject matter. The mobile 501 transmits an information signal. The repeater 510, in normal operation, receives, amplifies and retransmits the signal as shown in Block 511. The scanning receiver 515 associated with the repeater scans for transmitted signals; and, upon acquiring the transmitted signal, either from the repeater or an independent antenna, the scanning receiver measures attributes of the signal as shown in Block 517. In Block 518, the scanning receiver 515 or augmentation sends the measurement of the attribute of the signal to the manager 530 over a communication interface 550. Alternatively, an analysis of the measured attributes can be conducted at the augmentation and the results of the analysis may be forwarded to the manager 530. The base station 520 receives the signal in Block 521 and operates in a normal fashion, with the operation of the augmentation 515 and manager 530 being transparent to the base station. The manager 530, upon receiving the measured attributes or analyses, determines if the mobile's signal is likely operated upon by the repeater 510. This determination is preferably based on proximity of the mobile to the repeater. For example, if the augmentation 515 measures a high transmit power level, as related to a threshold as in the case of mobile 405, then it is likely that mobile 405 is served by the repeater 510. However, if the transmit power level is below a predetermined level or threshold, as is likely for mobile 420, then it is not likely the mobile 420 is served by the repeater 510. The measured attributes may include signal strength, signal to noise ratio (SNR), band of received power, or other signal characteristics. In addition to communication of the measured attributes, the augmentation 515 also preferentially sends a channel or other identifier relating the measured attributes to the signal measured.

A method and system by which an augmented repeater may effectively determine if a mobile device, appliance, transceiver, etc. is operating within the proximity of the repeater, is yet another embodiment.

The augmented repeater embodiment also utilizes the scanning receiver to obtain timing information from downlink (forward link) signals in order to obtain timing on the uplink (reverse link) of the mobile. The timing derived from the downlink enables the receiver to narrow its search window for the mobile's uplink signal. Unlike location measurement units ("LMUs") which are typically located at known locations, such as at base stations, and are synchronized, the augmented repeater system is not equipped with GPS and thus advantageously relies upon the downlink to compensate for drift in its clock. The augmented repeater system, with the information gathered from the downlink signal, detects a mobile device in proximity to the augmented repeater system. Since every protocol has a defined uplink-downlink timing synchronization relationship, the downlink signal can be detected and used estimate the downlink timing to narrow the search window of the uplink signal. The uplink will be detected by the training sequence, pilot signal, or any known signal transmitted by the mobile. The augmented repeater system may also allow for a determination of the mobile's distance from the augmented system using known techniques such as time of arrival ("TOA"), Signal strength, quality of service ("QoS"), ("AoA"), etc.

Figure 6:
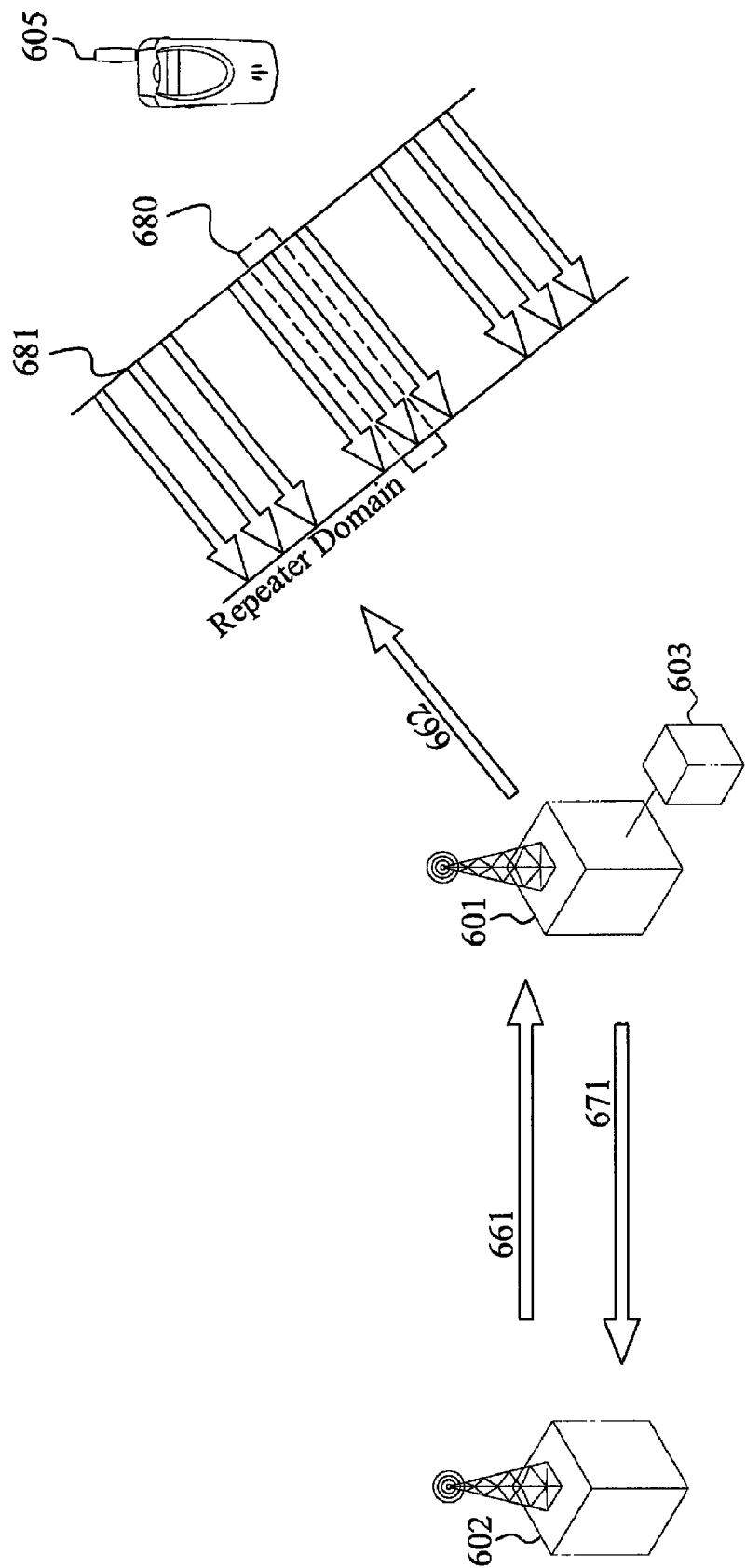
FIG. 6 is an illustration of a repeater based proximity detection system according to an embodiment of the present subject matter.

FIG. 6 is an illustration of an embodiment of the augmented repeater system. The repeater 601 is shown with a scanning receiver 603. The system also includes a processor, not shown, which may be incorporated in the scanning receiver 603, the repeater may be remote from the repeater, such as in the manager. The repeater 601 receives forward channel signal transmissions 661 from a base station 602. In normal operations the repeater 601 rebroadcasts the forward channel signal 661 and repeated forward channel signal 662. The repeater is typically unaware of the nature of the repeated signal or corresponding channels. If the mobile appliance 605 assigned to the forward channel is operating in the operational range of the repeater 601, it would be expected, although not a hard and fast rule, that the reverse channel, or uplink signal 672 would also be received and repeated as repeated reverse channel 671 by the repeater. The repeater in its operation would repeat any signal in its operational range which would include the additional reverse channels 681 as well as any other forward channels.

The scanning receiver 603 is interfaced to the repeater such that received signals may be obtained. The scanning receiver 603 searches for the forward channels and obtains timing information or other channel information from the received signals. Using the timing information from the forward channel along with information regarding the relationship between the forward and the reverse channel per protocol standards, the processor operably connected to the scanning receiver 603 may determine a search window 680 narrower than the operation domain of the repeater in order to search for a corresponding reverse channel. Any limitation upon the search spectrum reduces the time, complexity and cost associated with locating the reverse channel. Upon a determination of the search window 680, the scanning receiver is adjusted to detect the reverse channel 672. Characteristics of the scanner that may be adjusted to include frequency band, time slot, spiral sequence, hopping sequence, power level, sector assignment, or protocol. If the reverse channel 672 is detected within the search window, measurements regarding it's characteristics may be taken. These characteristics may be attributes that can be compared to predetermined thresholds to determine whether the reverse channel is emanating from a location proximate to the repeater. The determination may be made by comparing signal strength, QoS, timing advance, TOA, AoA, SNR or GPS measurements obtained from the reverse channel 672 with thresholds associated with the repeater and signals. This determination may be made locally at the repeater system or remotely.

Figure 7:
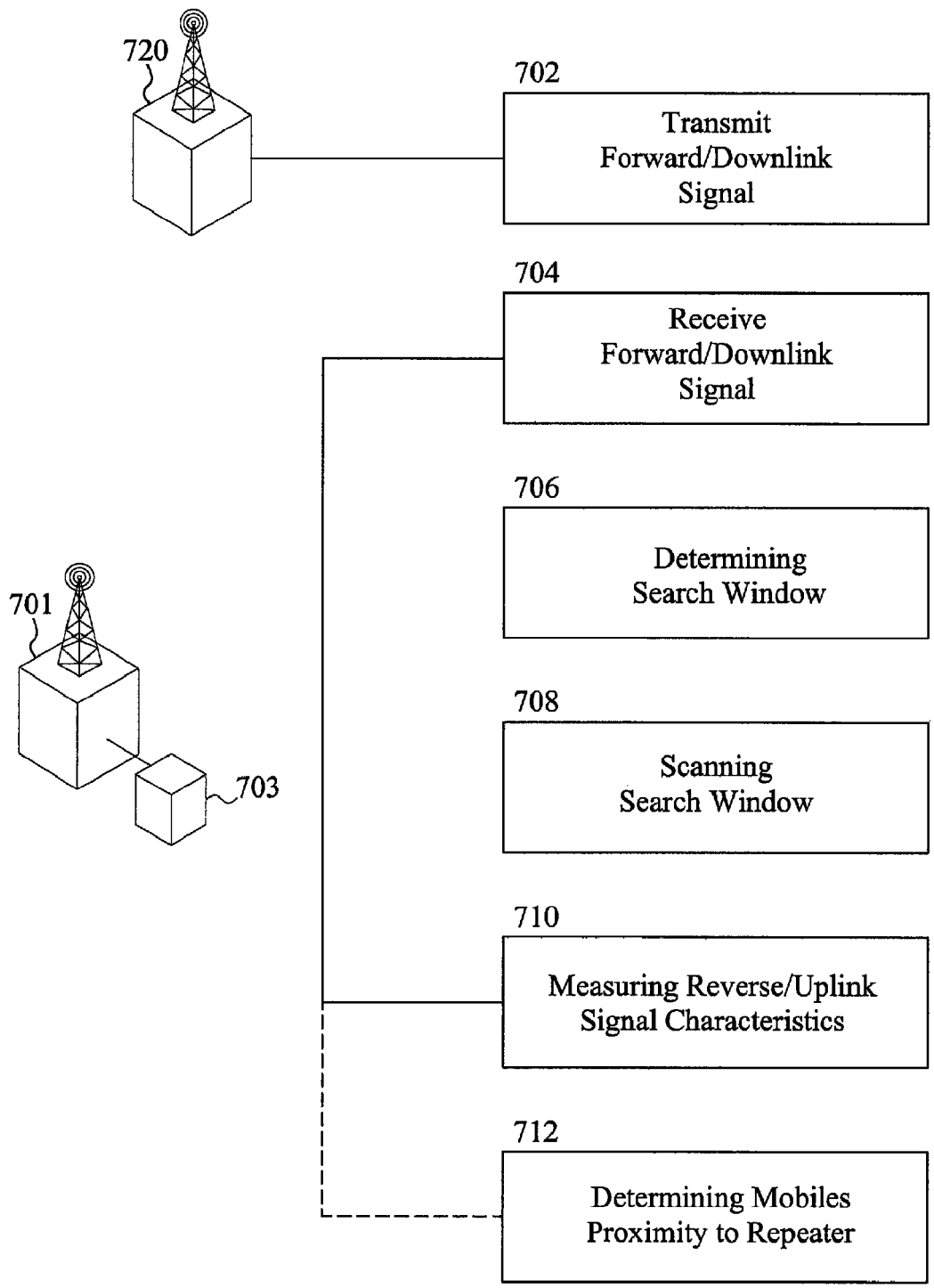
FIG. 7 is a representative flow chart for the operation of proximity detection according to an embodiment of the present subject matter.

FIG. 7 is a illustrative flow chart for a method of determining if a mobile is operating in the proximity of a repeater using information from the forward link. As shown in Block 702 a signal is transmitted over the downlink channel from base station 720. At the repeater 701, the downlink signals are received and it's attributes are measured by the scanning receiver 703 in Block 704. The attribute in the specific illustration being timing information, but frequency band, hopping sequence, time slot, spread code, may also be measured or obtained in Block 706. Using the information gathered from the downlink signal, a search window may be formulated using predetermined relationships between the forward channel and the reverse channel. For instance, the reverse channel may be offset in time a predetermined amount from the transmission of the forward link, or information in the forward link relates to the timing advance by which the reverse channel is determined. In both cases knowledge of the predetermined relationships may be used along with the obtained forward channel information to determine a time window to search for the reverse channel as shown in Block 706.

The scanning receiver 703 of the repeater may then be adjusted or tuned to cover the search window to acquire the reverse signal of the mobile, as shown in Block 708. Upon detection of the reverse signal, signal characteristics may be measured as shown in Block 710. Such characteristics may be used and compared with thresholds to determine the mobiles degree of proximity to the repeater as shown in Block 712. The thresholds may be determined based on network conditions, network topology, wireless protocol, etc. For instance in a sparsely populated network, the detection of the reverse signal itself may be a strong indication of its proximity to the repeater, whereas, in a congested high traffic area, the mere reception of the reverse signal may not be such a strong indication. The relative signal strength may be a stronger factor or the QoS of the signal may indication its service and proximity to the repeater.

The system may maintain a database of currently served mobile appliances and/or a historical list of those mobile appliances served. The database may also include additional information associated with the service, such as time, duration, network characteristics, QoS, signal strength, SNR, etc. Additionally, the repeater may affirmatively report to the manager which mobiles are likely in proximity to and/or served by the repeater, or the repeater system may report only the raw data and allow the manager to make the determination of which mobiles are served.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A proximity location system for locating mobile appliances in a wireless communication system, comprising:
   a repeater;
   a scanning receiver co-located with the repeater and interfaced to receive signals received at the repeater; and,
   a processor operably connected to the scanning receiver;
   wherein the scanning receiver is adapted to obtain a channel attribute of a forward channel of one of the mobile appliances and the processor is configured to determine a search window for a corresponding reverse channel of the mobile appliance based upon at least the channel attribute.

2. The wireless communication system of claim 1, wherein the processor is configured to determine the search window for the corresponding reverse channel of the mobile based upon a predetermined relationship between the forward channel and the reverse channel.

3. The proximity location system of claim 1, wherein the channel attribute is selected from frequency, spread code, time slot, hopping sequence, or a combination thereof.

4. The proximity location system of claim 1, wherein the scanning receiver is connected to an antenna of the at least one repeater.

5. The proximity location system of claim 4, wherein the scanner is configured to measure an attribute of the reverse channel signal.

6. The proximity location system of claim 1, wherein the scanner is configured to detect the reverse link based on the search window.

7. A method of determining if a mobile is operating in the proximity of a repeater wherein the repeater does not have independent timing synchronization, comprising:
   scanning a forward communication signal at a repeater;
   obtaining timing information from the forward signal;
   determining a search window for a reverse channel of the mobile based on the timing information and a predetermined relationship between the forward channel and the reverse channel;
   scanning the search window to detect the reverse channel mobile signal;

measuring an attribute of the mobile reverse channel signal; and, determining the mobile's proximity based on the measured attribute.

8. The method of claim 7, wherein the attribute reflects a proximity to the repeater.

9. The method of claim 8, wherein the attribute is from the group comprising signal strength, signal characteristics, SNR, band of received power, and combinations thereof.

10. A method of determining the proximity of a mobile to a repeater comprising:

scanning and receiving a forward channel signal with a scanning receiver co-located with the repeater;

obtaining channel information from the received forward channel signal;

adjusting a characteristic of the scanning receiver based upon the obtained channel information and a predetermined relationship between the forward channel and a reverse channel;

scanning for a reverse channel signal with the scanner, measuring one or more attributes of the scanned reverse channel signal; and, determining the proximity of the mobile to the repeater based at least in part on the measured attribute.

11. The method of claim 10, wherein the channel information comprises frequency, time slot, spread code, hopping sequence, or a combination thereof.

12. The method of claim 11, wherein the attribute comprises signal strength, signal to noise ratio (SNR), band of received power, signal characteristics, or a combination thereof.

13. A method of locating a mobile device at a repeater having a co-located scanning receiver, comprising:

monitoring downlink communication at a repeater to obtain timing information associated with the downlink communication;

determining a search window based on the timing information and a predetermined timing relationship between the downlink communication and an uplink communication;

tuning the scanner to scan the search window for the mobile device's uplink communication;

measuring a characteristic of the of the mobile device's uplink communication;

determining the mobile device's proximity to the repeater based on the measured characteristic; and, determining the location of the mobile based on its proximity to the repeater.

14. The method of claim 13, wherein the step of determining the location comprises comparing the proximity of the mobile device to the repeater to a threshold.

15. The method of claim 13, wherein the step of determining a search window includes bounding the estimated uplink transmit time.

16. The method of claim 13, wherein the step of determining a search window includes bounding an estimated frequency.

17. The method of claim 13, comprising reporting to a remote processor the mobile identity if it is determined to be proximate to the repeater.

* * * * *